United States Patent
Kidera et al.

(12) 
(10) Patent No.: US 11,912,617 B2
(45) Date of Patent: Feb. 27, 2024

(54) SILICA GLASS FOR RADIO-FREQUENCY DEVICE AND RADIO-FREQUENCY DEVICE TECHNICAL FIELD

(71) Applicant: AGC Inc., Chiyoda-ku (JP)

(72) Inventors: Nobutaka Kidera, Tokyo (JP); Kazuya Sasaki, Fukushima (JP); Yasutomi Iwahashi, Fukushima (JP)

(73) Assignee: AGC Inc., Chiyoda-ku (JP)

( * ) Notice: Subject to any disclaimer, the term of this patent is extended or adjusted under 35 U.S.C. 154(b) by 975 days.

(21) Appl. No.: 16/860,107

(22) Filed: Apr. 28, 2020

(65) Prior Publication Data

US 2020/0255324 A1    Aug. 13, 2020

Related U.S. Application Data

(63) Continuation of application No. PCT/JP2018/040155, filed on Oct. 29, 2018.

(30) Foreign Application Priority Data

Nov. 7, 2017 (JP) ................................. 2017-215119
Jan. 15, 2018 (JP) ................................. 2018-004232

(51) Int. Cl.
| | | |
|---|---|---|
| *C03C 3/06* | (2006.01) | |
| *C03C 4/16* | (2006.01) | |
| *H01P 1/208* | (2006.01) | |
| *H01P 3/12* | (2006.01) | |
| *H04B 1/40* | (2015.01) | |

(52) U.S. Cl.
CPC ............... *C03C 3/06* (2013.01); *C03C 4/16* (2013.01); *H01P 1/2088* (2013.01); *H01P 3/121* (2013.01); *C03C 2201/23* (2013.01); *C03C 2204/00* (2013.01); *H04B 1/40* (2013.01)

(58) Field of Classification Search
CPC ......... C03C 3/06; C03C 4/16; C03C 2201/23; H04B 1/40
See application file for complete search history.

(56) References Cited

U.S. PATENT DOCUMENTS

| | | |
|---|---|---|
| 5,330,941 A | 7/1994 | Yaba et al. |
| 6,927,653 B2 | 8/2005 | Uchimura et al. |
| 7,312,168 B2 * | 12/2007 | Anderson ........... C03C 23/0005 501/40 |
| 10,020,591 B2 | 7/2018 | Uemichi |
| 2005/0044893 A1 * | 3/2005 | Coon .................... C03C 23/008 65/32.1 |
| 2019/0348738 A1 | 11/2019 | Kamgaing et al. |

FOREIGN PATENT DOCUMENTS

| | | | | |
|---|---|---|---|---|
| CN | 103515679 A | | 1/2014 | |
| EP | 1 067 097 A1 | | 1/2001 | |
| EP | 1 302 999 A1 | | 4/2003 | |
| EP | 3 618 174 A1 | | 3/2020 | |
| JP | 07-330357 A | | 12/1995 | |
| JP | H07330357 A | * | 12/1995 | ............. C03B 20/00 |
| JP | 2000-239031 A | | 9/2000 | |
| JP | 2004-099376 A | | 4/2004 | |
| JP | 2004099376 A | * | 4/2004 | ........... C03B 37/025 |
| JP | 2005-020415 A | | 1/2005 | |
| JP | 2009-51677 A | | 3/2009 | |
| JP | 2009-298686 A | | 12/2009 | |
| JP | 2014-023028 A | | 2/2014 | |
| JP | 2015-207969 A | | 11/2015 | |
| JP | 6312910 B1 | | 4/2018 | |

OTHER PUBLICATIONS

Williams, et al., "Direct Determination of Water in Glass", Ceramic Bulletin, vol. 55, No. 5, 1976, 2 pages.

Kato et al., "Permittivity measurements and associated uncertainties up to 110 GHz in circular-disk resonator method", Proceedings of the 46th European Microwave Conference, Oct. 4-6, 2016, 4 pages.

Office Action dated Nov. 24, 2021 in co-pending U.S. Appl. No. 16/911,459, 10 pages.

Hosono et al., "Quarts Substrate Based PWW Millimeter-Wave Bandpass Filter Designed by 2D-MoM Optimization Method", Japan Electronics and Information Communications Society, 2016, 4 pages (with English translation).

* cited by examiner

*Primary Examiner* — Karl E Group

(74) *Attorney, Agent, or Firm* — Oblon, McClelland, Maier & Neustadt, L.L.P.

(57) ABSTRACT

A silica glass for a radio-frequency device has an OH group concentration being less than or equal to 300 wtppm; an FQ value being higher than or equal to 90,000 GHz at a frequency of higher than or equal to 25 GHz and lower than or equal to 30 GHz; and a slope being greater than or equal to 1,000 in a case where the FQ value is approximated as a linear function of the frequency in a frequency band of higher than or equal to 20 GHz and lower than or equal to 100 GHz.

10 Claims, 7 Drawing Sheets

SILICA GLASS FOR RADIO-FREQUENCY DEVICE AND RADIO-FREQUENCY DEVICE TECHNICAL FIELD

CROSS-REFERENCE TO RELATED APPLICATIONS

This U.S. non-provisional application is a continuation application of and claims the benefit of priority under 35 U.S.C. § 365(c) from PCT International Application PCT/JP2018/040155 filed on Oct. 29, 2018, which is designated the U.S., and is based upon and claims the benefit of priority of Japanese Patent Application No. 2017-215119 filed on Nov. 7, 2017, and Japanese Patent Application No. 2018-004232 filed on Jan. 15, 2018, the entire contents of which are incorporated herein by reference.

TECHNICAL FIELD

The present disclosure relates to a silica glass for a radio-frequency device, and a radio-frequency device.

BACKGROUND ART

Conventionally, antennas, filters, demultiplexers, diplexers, capacitors, inductors, and the like have been known as radio-frequency devices used as passive devices in a radio-frequency band of microwaves, millimeter waves, and the like. For example, as forms of a filter, which is one of the radio-frequency devices, configurations using transmission lines such as a waveguide, an SIW (Substrate Integrated Waveguide), and a microstrip line have been known.

In recent years, wireless transmission using a microwave band or a millimeter-wave band has been attracting attention as a large-capacity transmission technology. However, there is a problem that as available frequencies expand, the signal frequency to be used may become higher, and thereby, the dielectric loss in a dielectric layer of a radio-frequency device becomes greater. Thereupon, as the material of a dielectric substrate, a material having a small dielectric loss has been attracting attention. For example, as such a dielectric having a small dielectric loss, quartz has been known to have a small dielectric loss tangent tanδ (see, e.g., Patent Document 1).

Meanwhile, it has been known that when a quartz glass material that has a relatively low OH group concentration and an FQ value in a microwave frequency band being higher than or equal to a predetermined value is used, absorption of microwave power into the quartz glass material is controlled (see, e.g., Patent Document 2). Note that the FQ value is a product of the frequency F and the Q value (the reciprocal of the dielectric loss tangent tan δ).

Prior Art Documents

[Patent Document 1] Japanese Unexamined Patent Application Publication No. 2014-23028
[Patent Document 2] Japanese Unexamined Patent Application Publication No. H7-330357
[Non-Patent Document 1] J. Paul Williams, Yao-sin Su, Wesley R. Strzegowski, Barry L. Butler, Herbert L. Hoover, and Vincent 0. Altemose, "Direct determination of water in glass" Ceramic. Bulletin., Vol. 55, No. 5, pp 524, 1976
[Non-Patent Document 2] Y. Kato and M. Horibe, "Permittivity measurements and associated uncertainties up to 110 GHz in circular-disk resonator method" Proceedings of the 46th European Microwave Conference (2016) 4-6 Oct. 2016

There is a description in Patent Document 2 that the FQ value is constant. The FQ value being constant means that as the frequency F becomes higher, the Q value becomes smaller (the dielectric loss tangent tan δ becomes greater), and the dielectric loss becomes greater.

However, the inventors of the present inventive concept have conducted research on the relationship between the OH group concentration (hydroxyl group concentration), the frequency F, and the FQ value, and found that within a frequency band of higher than or equal to 20 GHz and lower than or equal to 100 GHz, in a silica glass having a low OH group concentration, the FQ value becomes higher as the frequency F becomes higher.

SUMMARY

According to one aspect of the present disclosure, a silica glass for a radio-frequency device is provided that has an OH group concentration being less than or equal to 300 wtppm; an FQ value being higher than or equal to 90,000 GHz at a frequency of higher than or equal to 25 GHz and lower than or equal to 30 GHz; and a slope being greater than or equal to 1,000 in a case where the FQ value is approximated as a linear function of the frequency in a frequency band of higher than or equal to 20 GHz and lower than or equal to 100 GHz.

EMBODIMENTS OF THE INVENTION

Figure 1:
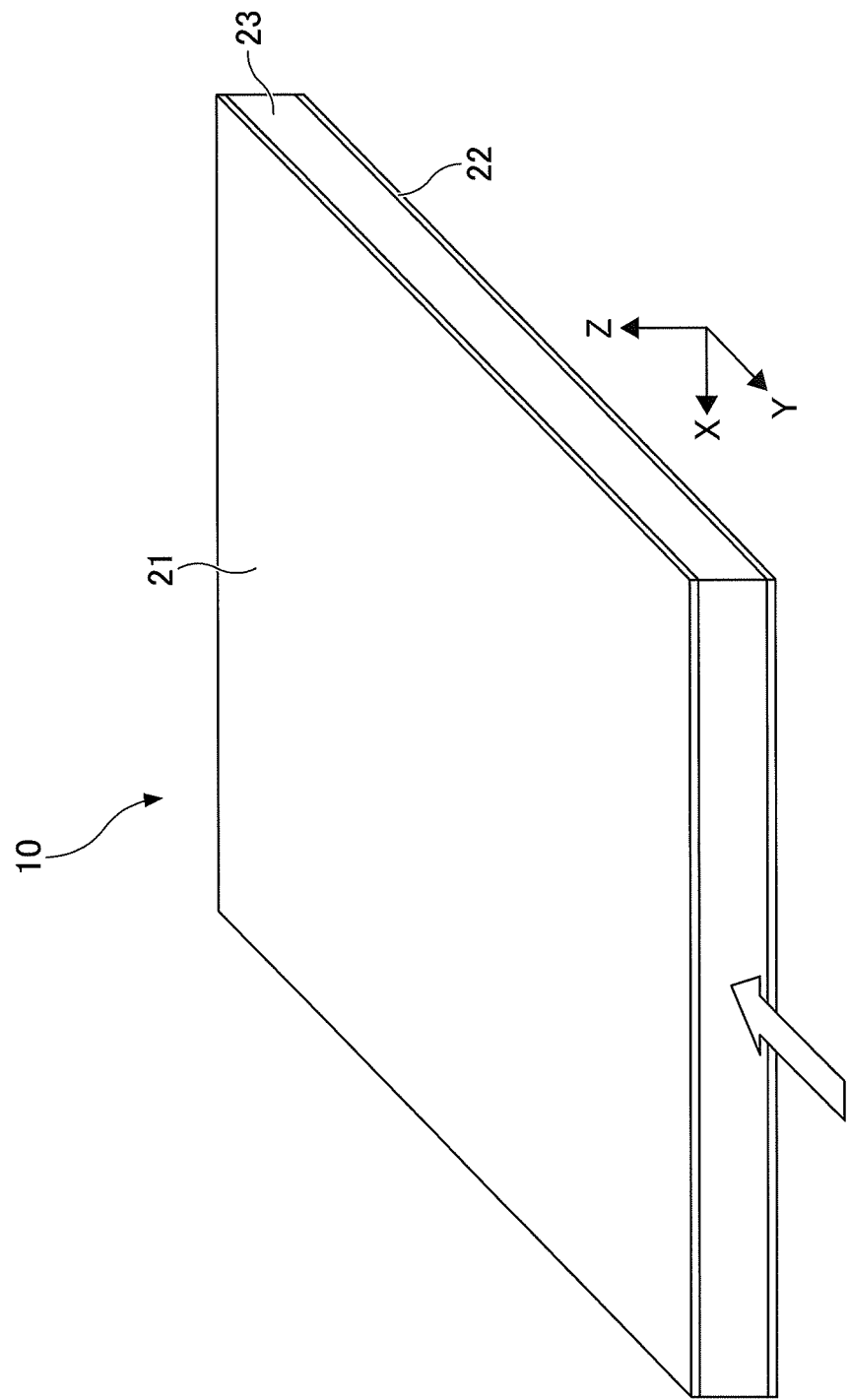
FIG. 1 is a perspective view illustrating an example of a configuration of a filter according to the present disclosure.

In the following, embodiments for carrying out the present inventive concept will be described; however, note that the present inventive concept is not limited as such.

According to a silica glass for a radio-frequency device in an aspect of the present disclosure, in a frequency band of higher than or equal to 20 GHz and lower than or equal to 100 GHz, the FQ value becomes higher while the frequency becomes higher; therefore, it is possible to control the increasing degree of dielectric loss that would become greater as the frequency becomes higher.

As one embodiment in the present disclosure, a synthetic silica glass produced by a VAD (Vapor-phase Axial Deposition) method can be cited. The method of producing synthetic silica glass is a method of synthesizing silica glass, by supplying a compound containing Si, oxygen gas, hydrogen gas, nitrogen gas, and the like as synthetic raw materials into a quartz glass burner, so as to cause the synthetic raw materials to undergo a hydrolysis reaction or an oxidation reaction in an oxyhydrogen flame. There are two types of methods for producing synthetic silica glass, a direct method and an indirect method (VAD method, OVD method, and the like).

The direct method is a synthesis method of directly synthesizing a transparent synthetic silica glass, in which a compound containing Si is flame-hydrolyzed at a temperature between 1,500 and 2,000° C. to synthesize $SiO_2$ particles, which are then deposited and fused on a base material.

On the other hand, the VAD method is a method of obtaining a transparent synthetic silica glass body, in which a compound containing Si is flame-hydrolyzed at a temperature between 1,000 and 1,500° C., to synthesize $SiO_2$ particles, which are then deposited on a base material to obtain a porous synthetic silica glass body, and then, by raising the temperature to 1,400 to 1,500° C., to densify the porous synthetic silica glass body.

Also, the synthetic raw material of a synthetic silica glass is not limited in particular as long as it is a raw material that can be gasified; for example, a chloride such as $SiCl_4$, $SiHCl_3$, $SiH_2Cl_2$, or $SiCH_3Cl_3$; a silicon halide compound such as a fluoride of $SiF_4$, $SiHF_3$, or $SiH_2F_2$; a silicide that does not contain halogen such as an alkoxysilane expressed as $R_nSi(OR)_{4-n}$ (where R represents an alkyl group having 1 to 4 carbon atoms, and n represents an integer of 0 to 3), $(CH_3)_3Si$—O—$Si(CH_3)_3$, or the like.

After having obtained a porous silica glass body, the porous silica glass body is heated to a transparent-vitrification temperature to make the glass body transparent, to obtain a dense silica glass body. The transparent-vitrification temperature is normally between 1,300 and 1,600° C., particularly favorably between 1,350° C. and 1,500° C. The atmosphere is favorably an atmosphere containing 100% of an inert gas such as helium, or an atmosphere containing as the main component an inert gas such as helium. The pressure may be reduced pressure or normal pressure. In particular, in the case of normal pressure, helium gas can be used.

Further, under reduced pressure, the OH group reduction process and the transparent-vitrification process can be performed simultaneously. In this case, after having reduced the OH group by maintaining the temperature between 1,200 and 1,350° C. for 20 to 70 hours under reduced pressure, the temperature is raised to 1,350 to 1,500° C. to cause a transition to transparent glass. The OH group concentration can be adjusted by the processing time and the processing temperature. At the same processing temperature, a longer processing time reduces the OH group concentration lower. If the processing temperature is too low, a dehydration reaction does not occur in the glass, or if the processing temperature is too high, sintering proceeds to densify the glass, and moisture in the glass does not escape to the outside; therefore, the processing temperature is favorably in a range between 1,000 and 1,350° C.

The silica glass body obtained in this way is heated to a temperature higher than or equal to the softening point and molded into a desired shape to obtain a silica glass molded body. The temperature range of the molding process is favorably between 1,650° C. and 1,800° C. This is because if the temperature is lower than 1,650° C., the silica glass has a high viscosity, and hence, is not substantially deformed by its own weight; also, cristobalite as a crystal phase of $SiO_2$ grows, which may cause so-called devitrification. This is also because if the temperature is higher than 1,800° C., sublimation of $SiO_2$ cannot be ignored.

A silica glass in the present embodiment has an OH group concentration of less than or equal to 300 wtppm, favorably less than or equal to 100 wtppm, more favorably less than or equal to 40 wtppm, and even more favorably less than or equal to 10 wtppm. When electromagnetic waves are transmitted through a silica glass formed with such an OH group concentration, the dielectric loss in a frequency band of microwaves and millimeter waves can be reduced. Here, the frequency band of microwaves and millimeter waves means a band higher than or equal to 300 MHz and lower than or equal to 300 GHz; wtppm represents mass fraction; and ppm represents parts per million.

In a silica glass in the present embodiment, the concentration of metal impurities such as alkali metals (Na, K, Li, etc.), alkaline earth metals (Mg, Ca, etc.), transition metals (Fe, Ni, Cr, Cu, Mo, W, Al, Ti, Ce, etc.), and the like is less than or equal to 100 ppb, favorably less than or equal to 20 ppb, more favorably less than or equal to 10 ppb, and even more favorably less than or equal to 5 ppb. By controlling the metal impurities contained in the silica glass to such a concentration, it is possible to control the occurrence of metal contamination in a manufacturing process of a radio-frequency device. Here, ppb represents parts per billion.

The OH group concentration of a silica glass in the present embodiment can be measured by an infrared spectrophotometer according to Non-Patent Document 1 described above.

The concentration of the metal impurities contained in a silica glass in the present embodiment can be evaluated by ICP (Inductively Coupled Plasma) mass spectrometry.

The FQ value as an evaluation value of the dielectric loss of a silica glass in the present embodiment can be obtained by a product of the frequency F and the Q value (the reciprocal of the dielectric loss tangent tan $\delta$). Also, the dielectric loss tangent tan $\delta$ of a silica glass can be evaluated by a balanced disk resonator method described in Non-Patent Document 2 described above.

After having advanced the research on the relationship between the OH group concentration, the frequency F, and the FQ value, the inventors have found that a silica glass having an OH group concentration of less than or equal to 300 wtppm has an FQ value of higher than or equal to 90,000 GHz at a frequency of higher than or equal to 25 GHz and lower than or equal to 30 GHz, and a slope of greater than or equal to 1,000 when the FQ value is approximated as a linear function of the frequency in a frequency band of higher than or equal to 20 GHz and lower than or equal to 100 GHz. In other words, the inventors have found that in a frequency band of higher than or equal to 20 GHz and lower than or equal to 100 GHz, the FQ value becomes higher as the frequency F becomes higher.

On the other hand, the inventors have found that a silica glass having an OH group concentration exceeding 300 wtppm has a virtually constant FQ value regardless of the frequency F of an electromagnetic wave transmitting through the silica glass. In particular, the inventors have found that a silica glass having an OH group concentration exceeding 300 wtppm has an FQ value of less than 90,000 GHz at a frequency of higher than or equal to 25 GHz and lower than or equal to 30 GHz, and a slope of less than 1,000 when the FQ value is approximated as a linear function of the frequency in a frequency band of higher than or equal to 20 GHz and lower than or equal to 100 GHz. When the FQ value is virtually constant regardless of the frequency F, as the frequency F becomes higher, the Q value becomes smaller (the dielectric loss tangent tan $\delta$ becomes greater), and the dielectric loss becomes greater.

In contrast, a silica glass having an OH group concentration of less than or equal to 300 wtppm has the following characteristics: an FQ value of higher than or equal to 90,000 GHz at a frequency of higher than or equal to 25 GHz and lower than or equal to 30 GHz; and a slope of greater than or equal to 1,000 when the FQ value is approximated as a linear function of the frequency in a frequency band of higher than or equal to 20 GHz and lower than or equal to 100 GHz. In a silica glass having such characteristics, compared to a silica glass whose FQ value is virtually constant regardless of the frequency F, the decreasing degree of the Q value (the increasing degree of the dielectric loss tangent tan δ) becomes smaller as the frequency F becomes higher in a frequency band of higher than or equal to 20 GHz and lower than or equal to 100 GHz. In other words, in a frequency band of higher than or equal to 20 GHz and lower than or equal to 100 GHz, it is possible to provide a silica glass that can control the increasing degree of the dielectric loss that would become greater as the frequency becomes higher. In a silica glass having an OH group concentration of less than or equal to 300 wtppm, although it is favorable that the FQ value is higher at a frequency of higher than or equal to 25 GHz and lower than or equal to 30 GHz, normally, the upper limit is favorably lower than or equal to 230,000 GHz. Also, in a frequency band of higher than or equal to 20 GHz and lower than or equal to 100 GHz, although it is favorable that the slope is greater when the FQ value is approximated as a linear function of the frequency, normally, the upper limit is favorably less than or equal to 1,600.

Also, the inventors have found that a silica glass having an OH group concentration of less than or equal to 100 wtppm has an FQ value of higher than or equal to 100,000 GHz at a frequency of higher than or equal to 25 GHz and lower than or equal to 30 GHz, and a slope of greater than or equal to 1,000 when the FQ value is approximated as a linear function of the frequency in a frequency band of higher than or equal to 20 GHz and lower than or equal to 100 GHz. When using a silica glass having such characteristics, compared to a silica glass whose FQ value is virtually constant regardless of the frequency F, the decreasing degree of the Q value (the increasing degree of the dielectric loss tangent tan δ) becomes further smaller as the frequency F becomes higher in a frequency band of higher than or equal to 20 GHz and lower than or equal to 100 GHz. In other words, in a frequency band of higher than or equal to 20 GHz and lower than or equal to 100 GHz, it is possible to provide a silica glass that can further control the increasing degree of the dielectric loss that would become greater as the frequency becomes higher. In a silica glass having an OH group concentration of less than or equal to 100 wtppm, although it is favorable that the FQ value is higher at a frequency of higher than or equal to 25 GHz and lower than or equal to 30 GHz, normally, the upper limit is favorably lower than or equal to 230,000 GHz. Also, in a frequency band of higher than or equal to 20 GHz and lower than or equal to 100 GHz, although it is favorable that the slope is greater when the FQ value is approximated as a linear function of the frequency, normally, the upper limit is favorably less than or equal to 1,600.

Also, the inventors have found that a silica glass having an OH group concentration of less than or equal to 40 wtppm has an FQ value of higher than or equal to 160,000 GHz at a frequency of higher than or equal to 25 GHz and lower than or equal to 30 GHz, and a slope of greater than or equal to 1,000 when the FQ value is approximated as a linear function of the frequency in a frequency band of higher than or equal to 20 GHz and lower than or equal to 100 GHz. In a silica glass having an OH group concentration of less than or equal to 40 wtppm, although it is favorable that the FQ value is higher at a frequency of higher than or equal to 25 GHz and lower than or equal to 30 GHz, normally, the upper limit is favorably lower than or equal to 230,000 GHz. Also, in a frequency band of higher than or equal to 20 GHz and lower than or equal to 100 GHz, although it is favorable that the slope is greater when the FQ value is approximated as a linear function of the frequency, normally, the upper limit is favorably less than or equal to 1,600. Further, the inventors have found that a silica glass having an OH group concentration of less than or equal to 10 wtppm has an FQ value of higher than or equal to 160,000 GHz at a frequency of higher than or equal to 25 GHz and lower than or equal to 30 GHz, and a slope of greater than or equal to 1,250 when the FQ value is approximated as a linear function of the frequency in a frequency band of higher than or equal to 20 GHz and lower than or equal to 100 GHz. In a silica glass having an OH group concentration of less than or equal to 10 wtppm, although it is favorable that the FQ value is higher at a frequency of higher than or equal to 25 GHz and lower than or equal to 30 GHz, normally, the upper limit is favorably lower than or equal to 230,000 GHz. Also, in a frequency band of higher than or equal to 20 GHz and lower than or equal to 100 GHz, although it is favorable that the slope is greater when the FQ value is approximated as a linear function of the frequency, normally, the upper limit is favorably less than or equal to 1,600. Even when using a silica glass having these characteristics, compared to a silica glass whose FQ value is virtually constant regardless of the frequency F, the decreasing degree of the Q value (the increasing degree of the dielectric loss tangent tans) becomes further smaller as the frequency F becomes higher in a frequency band of higher than or equal to 20 GHz and lower than or equal to 100 GHz. In other words, in a frequency band of higher than or equal to 20 GHz and lower than or equal to 100 GHz, it is possible to provide a silica glass that can further control the increasing degree of the dielectric loss that would become greater as the frequency becomes higher.

In particular, in the case of the OH group concentration being less than or equal to 10 wtppm, compared to the case of the OH group concentration exceeding 10 wtppm, the slope becomes higher when the FQ value is approximated as a linear function of the frequency in a frequency band of higher than or equal to 20 GHz and lower than or equal to 100 GHz, and hence, the increasing degree of the dielectric loss can be controlled significantly.

In this way, a silica glass in the present disclosure has a characteristic that the FQ value becomes higher as the frequency becomes higher. A silica glass in the present disclosure can be used not only in a frequency band of higher than or equal to 20 GHz and lower than or equal to 40 GHz used in wireless transmission systems, but also in a frequency band of greater than or equal to 40 GHz and less than or equal to 70 GHz, which is considered to be used for achieving even larger-capacity communication, to control the increase in dielectric loss. Further, using a silica glass in the present disclosure enables to control the increase in dielectric loss even in a frequency band of higher than or equal to 70 GHz and less than or equal to 100 GHz, which is considered for application to a high-resolution radar system or the like for safe driving assistance and collision avoidance of automobiles and the like.

For example, a silica glass in the present disclosure has an OH group concentration of less than or equal to 40 wtppm, and it is favorable that the FQ value is higher than or equal to 125,000 GHz at a frequency of higher than or equal to 20 GHz and less than 40 GHz, and the upper limit of the FQ value is favorably lower than or equal to 230,000 GHz. It is favorable that the FQ value is higher than or equal to 175,000 GHz at a frequency of higher than or equal to 40 GHz and less than 70 GHz, and the upper limit of the FQ value is favorably lower than or equal to 300,000 GHz. It is favorable that the FQ value is higher than or equal to 200,000 GHz at a frequency of higher than or equal to 70 GHz and less than or equal 100 GHz, and the upper limit of the FQ value is favorably lower than or equal to 330,000 GHz. Also, a silica glass in the present disclosure has an OH group concentration of less than or equal to 10 wtppm, and it is favorable that the FQ value is higher than or equal to 150,000 GHz at a frequency of higher than or equal to 20 GHz and less than 40 GHz, and the upper limit of the FQ value is favorably lower than or equal to 230,000 GHz. It is favorable that the FQ value is higher than or equal to 200,000 GHz at a frequency of higher than or equal to 40 GHz and less than 70 GHz, and the upper limit of the FQ value is favorably lower than or equal to 300,000 GHz. It is favorable that the FQ value is higher than or equal to 225,000 GHz at a frequency of higher than or equal to 70 GHz and less than or equal to 100 GHz, and the upper limit of the FQ value is favorably lower than or equal to 330,000 GHz. A silica glass having such characteristics can be suitably applied to any of the above-described applications having different operational frequencies in controlling the increase in dielectric loss.

A silica glass in the present disclosure can be suitably used for forming radio-frequency devices used in various wireless systems. Specific examples of radio-frequency devices include transmission lines such as waveguides, SIWs and microstrip lines, and passive devices such as antennas, filters, demultiplexers, diplexers, capacitors, and inductors. By applying a silica glass in the present disclosure to the dielectric of these radio-frequency devices, it is possible to provide a low-loss, high-performance, radio-frequency device.

Next, a configuration example of a filter formed using a silica glass in the present disclosure will be described. Note that in the following description, the X-axis direction, the Y-axis direction, and the Z-axis direction represent a direction parallel to the X axis, a direction parallel to the Y axis, and a direction parallel to the Z axis, respectively. The X-axis direction, the Y-axis direction, and the Z-axis direction are orthogonal to each other. The XY plane, YZ plane, and ZX plane represent, respectively, a virtual plane parallel to the X axis direction and the Y axis direction, a virtual plane parallel to the Y axis direction and the Z axis direction, and a virtual plane parallel to the Z axis direction and the X axis direction.

The filter according to the present disclosure is a waveguide filter including a waveguide formed in a dielectric surrounded by a conductor wall, to filter a radio-frequency signal in a radio-frequency band including microwaves and/or millimeter waves (e.g., 0.3 GHz to 300 GHz). The filter according to the present disclosure is suitable for filtering a radio-frequency signal corresponding to a radio wave transmitted or received by an antenna, for example, in a fifth-generation mobile communication system (so-called 5G) or a vehicle-installed radar system.

FIG. 1 is a perspective view illustrating an example of a configuration of a filter according to the present disclosure. A filter 10 according to the present disclosure illustrated in FIG. 1 is a band-pass filter having an SIW structure formed with a first conductor layer 21, a second conductor layer 22, and a dielectric 23 sandwiched between the first conductor layer 21 and the second conductor layer 22. The filter 10 passes a radio-frequency signal in a predetermined frequency band passing in the Y-axis direction, and blocks a radio-frequency signal in a frequency band other than the above frequency band.

The first conductor layer 21 and the second conductor layer 22 are planar conductors arranged parallel to the XY plane, and face each other in the Z-axis direction. The first conductor layer 21 and the second conductor layer 22 are formed in a rectangular shape with the Y-axis direction as the longitudinal direction. As the material of the first conductor layer 21 and the second conductor layer 22, for example, silver, copper, or the like may be listed.

The dielectric 23 is formed in a rectangular parallelepiped shape with the Y-axis direction as the longitudinal direction. Although not explicitly illustrated in FIG. 1, so as to form a waveguide in the dielectric 23, on a pair of side surfaces facing each other in the X-axis direction of the dielectric 23 or on a pair of boundary surfaces facing each other in the X-axis direction and positioned in the dielectric 23, a conductor wall is formed. As the material of the dielectric 23, a silica glass in the present disclosure is used.

Figure 2:
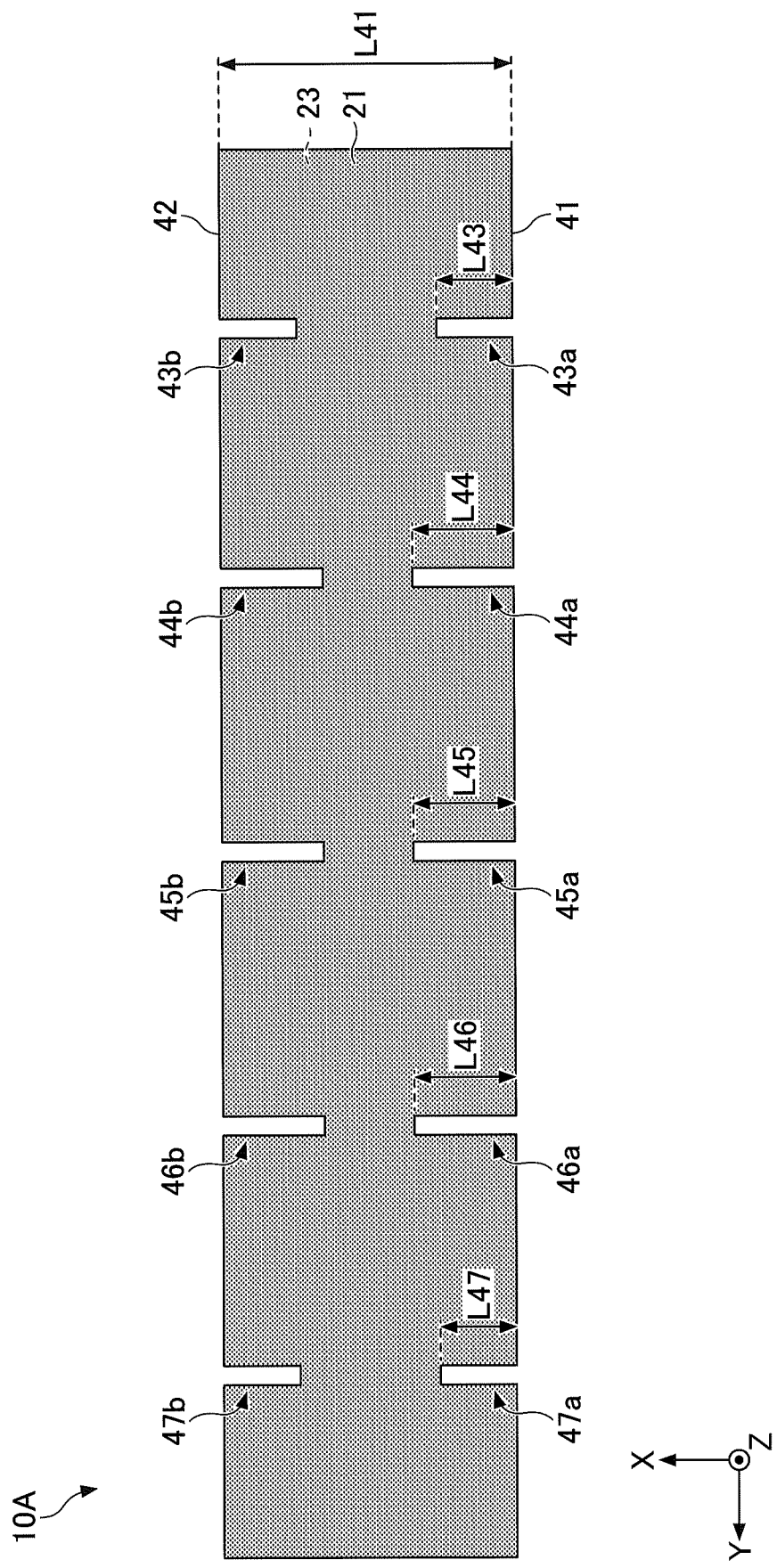
FIG. 2 is a plan view illustrating a filter according to a first embodiment in the present disclosure.

FIG. 2 is a plan view illustrating a filter according to a first embodiment in the present disclosure. A bandpass filter 10A illustrated in FIG. 2 is an example of the filter 10 in FIG. 1, that includes a waveguide formed in a dielectric 23 surrounded by conductor walls. The conductor walls surrounding the dielectric 23 include an upper conductor wall corresponding to the first conductor layer 21, a lower conductor wall corresponding to the second conductor layer 22, and a pair of side conductor walls 41 and 42 formed on a pair of side surfaces facing each other in the X-axis direction of the dielectric 23.

The dielectric part surrounded by the pair of side conductor walls 41 and 42, the upper conductor wall, and the lower conductor wall function as a waveguide extending in the Y-axis direction so as to guide an electromagnetic wave in the Y-axis direction.

Each of the pair of side conductor walls 41 and 42 has multiple control walls protruding in the X-axis direction inward the waveguide. The bandpass filter 10A according to the first embodiment includes control walls 43a to 47a protruding from the first side conductor wall 41 toward the second side conductor wall 42, and control walls 43b to 47b protruding from the second side conductor wall 42 toward the first side conductor wall 41. Each of these control walls is formed as a conductor slit whose surface is covered with a conductor. Each of the conductor slits has an upper end connected to the upper conductor wall and a lower end connected to the lower conductor wall, which corresponds to, for example, a part where the conductor is coated on the surface of the slit provided by cutting or the like on the dielectric 23.

Also, these control walls are formed, for example, so as to be orthogonal to the upper conductor wall and the lower conductor wall parallel to the XY plane, and orthogonal to the pair of side conductor walls 41 and 42 parallel to the YZ plane (i.e., formed parallel to the ZX plane). The control walls 43a to 47a are formed in the Y-axis direction, for example, at equal intervals provided between adjacent control walls, so as to protrude from the first side conductor wall 41 toward the second side conductor wall 42. Similarly, the control walls 43b to 47b are formed in the Y-axis direction, for example, at equal intervals provided between adjacent control walls, so as to protrude from the second side conductor wall 42 toward the first side conductor wall 41. In other words, the X-axis direction illustrated in FIG. 2 corresponds to the protruding direction of each of the control walls 43a to 47a and 43b to 47b.

For example, the pair of control walls 43a and 43b; the pair of control walls 44a and 44b; the pair of control walls 45a and 45b; the pair of control walls 46a and 46b; and the pair of control walls 47a and 47b are formed in the same ZX plane. Note that the position of each of these pairs of control walls may be shifted from each other in the Y-axis direction.

L43 to L47 represent the lengths of the control walls 43a to 47a in the X-axis direction, respectively. Each of the control walls 43a to 47a is set to have a length such that it can be seen as a wall when viewed from an electromagnetic wave propagating through the waveguide, and functions as a post wall to reflect the electromagnetic wave propagating through the waveguide. It is favorable to set the same lengths for the control walls 43b to 47b.

Also, it is favorable that an interval L41 between the pair of side conductor walls 41 and 42 is approximately equivalent to λg/2 where λg represents the wavelength of an electromagnetic wave propagating through the waveguide (guided wavelength in the waveguide). Also, the interval between adjacent control walls in the Y-axis direction is approximately equivalent to λg/2 where λg represents the wavelength of an electromagnetic wave propagating through the waveguide (wavelength in the waveguide).

The control walls 43a to 47a are arranged at intervals in the Y-axis direction, and the lengths of the control walls 43a to 47a in the X-axis direction may gradually increase or decrease in the arrangement order of the control walls 43a to 47a in the Y-axis direction. This enables to highly precisely adjust the degree of controlling the reflection loss of electromagnetic waves propagating through the waveguide. For example, L47, L46, and L45 gradually increase in this order, and L44 and L43 gradually decrease in this order. Similarly, the lengths in the X-axis direction of the control walls 43b to 47b arranged at intervals in the Y-axis direction may also gradually increase or decrease in the arrangement order of the control walls 43b to 47b in the Y-axis direction, which enables to highly precisely adjust the degree of controlling the reflection loss of electromagnetic waves propagating through the waveguide. Note that the length of each control wall in the X-axis direction may be set to the same dimension.

The control walls 43a to 47a and 43b to 47b form multiple resonators, each of which is constituted with a pair of control walls facing each other in the X-axis direction and a pair of control walls adjacent to each other in the Y-axis direction, arranged in the Y-axis direction, and has a length of approximately λg/2 (the wavelength of an electromagnetic wave propagating through a waveguide (wavelength in waveguide)) is assumed to be λg). Coupling between these resonators is adjusted by the length in the X-axis direction and the width (wall thickness) in the Y-axis direction of each control wall, which affects the reflection characteristic and frequency characteristic as a filter. In this way, the bandpass filter 10A has multiple stages (four stages in the case of FIG. 2) of resonators formed between the control walls adjacent in the Y-axis direction.

Next, examples of silica glasses of the present inventive concept will be described.

Figure 3:
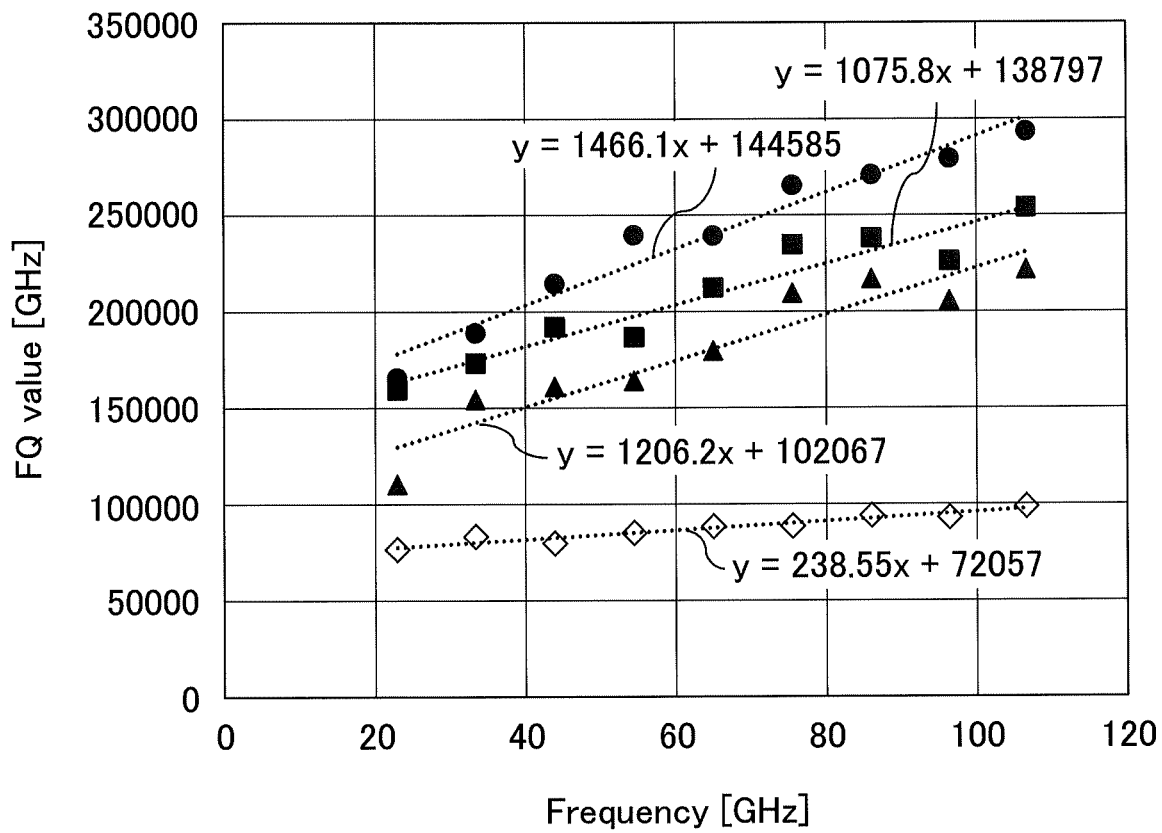
FIG. 3 is a diagram illustrating an example of the relationship between the frequency and the FQ value with respect to multiple silica glasses having different OH group concentrations.

FIG. 3 is a diagram illustrating an example of the relationship between the frequency and the FQ value with respect to multiple silica glasses having different OH group concentrations. Sample glass materials in Examples 1 to 3 are examples of silica glasses of the present inventive concept, which are synthetic silica glasses produced by a VAD method, each having a different OH group concentration. The OH group concentrations in Examples 1 to 3 are 5 wtppm, 34 wtppm, and 82 wtppm, respectively. A sample glass material in Comparative Example 1 is a synthetic silica glass produced by a direct method. The OH group concentration in Comparative Example 1 is 1,122 wtppm.

FIG. 3 illustrates an example of evaluation results of the FQ values of these sample glass materials. It can be seen that the sample glass materials in Examples 1 to 3 having lower OH group concentrations have higher FQ values and smaller dielectric loss than in Comparative Example 1. Also, it can be seen that the dielectric loss becomes smaller as the OH group concentration becomes lower. Further, when approximating the FQ value as a linear function of the frequency, the slopes of the approximated linear functions of the sample glass materials in Examples 1 to 3 having the lower OH group concentrations are greater than that in Comparative Example 1, and the FQ values become significantly higher in a higher-frequency band. Thus, it can be understood that the dielectric loss can be controlled particularly in a higher-frequency band. Note that in the approximate linear functions expressed in FIG. 1, "y" represents the FQ value, and "x" represents the frequency.

Also, the concentrations of metal impurities in Examples 1 to 3 are less than or equal to 5 ppb, and Examples 1 to 3 can be suitably used in a radio-frequency device manufacturing process.

Figure 4:
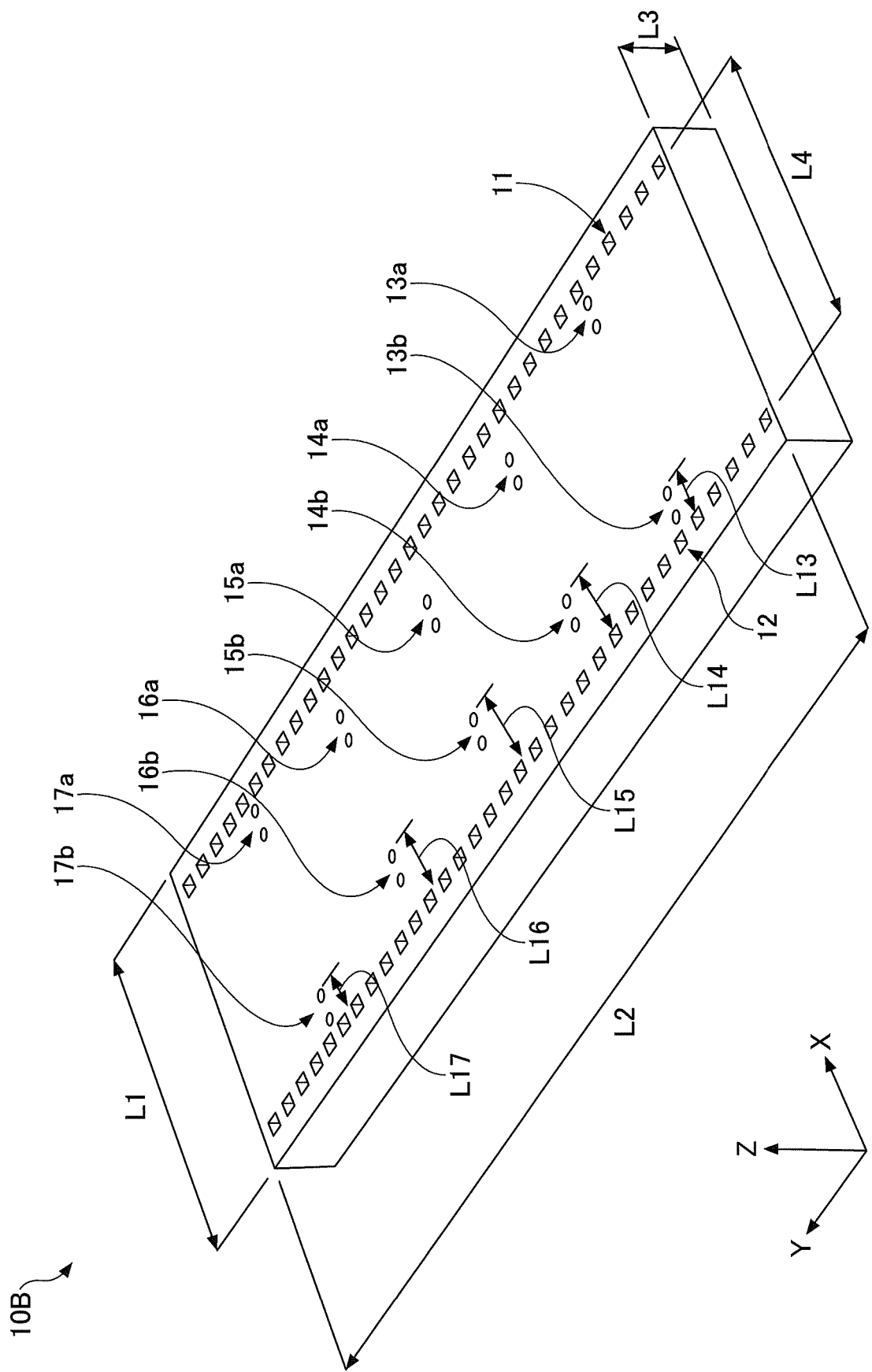
FIG. 4 is a perspective view illustrating one example of an SIW.

Also, assuming that a radio-frequency filter is to be produced using a silica glass in the present disclosure, a simulation of a pass characteristic S21, which is one of the S parameters, was performed with respect to an SIW-type band-pass filter 10B illustrated in FIG. 4.

Before describing the simulation, the configuration of the bandpass filter 10B will be described below.

FIG. 4 is a perspective view illustrating the filter according to a second embodiment in the present disclosure. A bandpass filter 10B illustrated in FIG. 4 is an example of the filter 10 in FIG. 1, that includes a waveguide formed in a dielectric surrounded by conductor walls. Note that in the description of the second embodiment, description for the same elements and effects as in the first embodiment will be omitted, as supported by the above description.

The bandpass filter 10B has an SIW structure formed by a first conductor layer, a second conductor layer, and a dielectric layer sandwiched between the first conductor layer and the second conductor layer. In FIG. 4, illustration of the first conductor layer and the second conductor layer is omitted to improve the visibility, and only a rectangular parallelepiped dielectric layer is illustrated. This dielectric layer is formed using a silica glass in the present disclosure. The X axis, the Y axis, and the Z axis are orthogonal to each other.

The dielectric layer of the bandpass filter 10B has a pair of post walls 11 and 12 arranged in two rows in the Y-axis direction. The dielectric part surrounded by the pair of post walls 11 and 12 and the first and second conductor layers, functions as a waveguide extending in the Y-axis direction so as to guide an electromagnetic wave in the Y-axis direction. Each of the pair of post walls 11 and 12 is a set of multiple conductor posts arranged in a fence shape. Each of the conductor posts is a columnar conductor having an upper end connected to the first conductor layer and a lower end connected to the second conductor layer, and is, for example, conductive plating formed on the wall surface of a through-hole penetrating through the dielectric layer in the Z-axis direction.

Also, the dielectric layer of the bandpass filter 10B has multiple control walls 13a, 13b, 14a, 14b, 15a, 15b, 16a, 16b, 17a, and 17b inward the waveguide. Each of these control walls is a set of multiple conductor posts arranged in a fence shape. Each of the conductor posts is a columnar conductor having an upper end connected to the first conductor layer and a lower end connected to the second conductor layer, and is, for example, conductive plating formed on the wall surface of a through-hole penetrating through the dielectric layer in the Z-axis direction.

Also, these control walls are formed so as to be orthogonal to the first conductive layer and the second conductive layer parallel to the XY plane, and to be orthogonal to the pair of post walls 11 and 12 parallel to the YZ plane (i.e., formed parallel to the ZX plane). The control walls 13a, 14a, 15a, 16a, and 17a are formed in the Y-axis direction at intervals provided between adjacent control walls, and formed so as to protrude from the first post wall 11 side toward the second post wall 12. The control walls 13b, 14b, 15b, 16b, and 17b are formed in the Y-axis direction at intervals provided between adjacent control walls, and formed so as to protrude from the second post wall 12 side toward the first post wall 11.

The pair of control walls 13a and 13b are formed in the same ZX plane. Similarly, the pair of control walls 14a and 14b; the pair of control walls 15a and 15b; the pair of control walls 16a and 16b; and the pair of control walls 17a and 17b are also formed in the same ZX plane.

The conductor posts in the control wall 13a are arranged at intervals sufficiently shorter than the wavelength of an electromagnetic wave propagating through the waveguide. The interval between a conductor post in the control wall 13a and a conductor post on the first post wall 11 is also set to be sufficiently shorter than the wavelength of an electromagnetic wave propagating through the waveguide. This enables the control wall 13a to function as a post wall to reflect an electromagnetic wave propagating through the waveguide. The same applies to the other control walls 13b, 14a, 14b, 15a, 15b, 16a, 16b, 17a, and 17b. Also, the interval L4 between the pair of post walls 11 and 12 is favorably virtually equivalent to $\lambda g/2$ where $\lambda g$ is the guided wavelength of an electromagnetic wave propagating through the waveguide.

In this way, the bandpass filter 10B has an SIW structure having multiple stages (four stages in FIG. 4) of resonators.

Next, a simulation for calculating the pass characteristic S21 of the bandpass filter 10B will be described. As the bandpass filter 10B used in the simulation, three types of filters A, B, and C were designed using the finite element method. The filter A is a bandpass filter in a frequency band including 28 GHz, the filter B is a bandpass filter in a frequency band including 60 GHz, and the filter C is a bandpass filter in a frequency band including 80 GHz.

Figure 5:
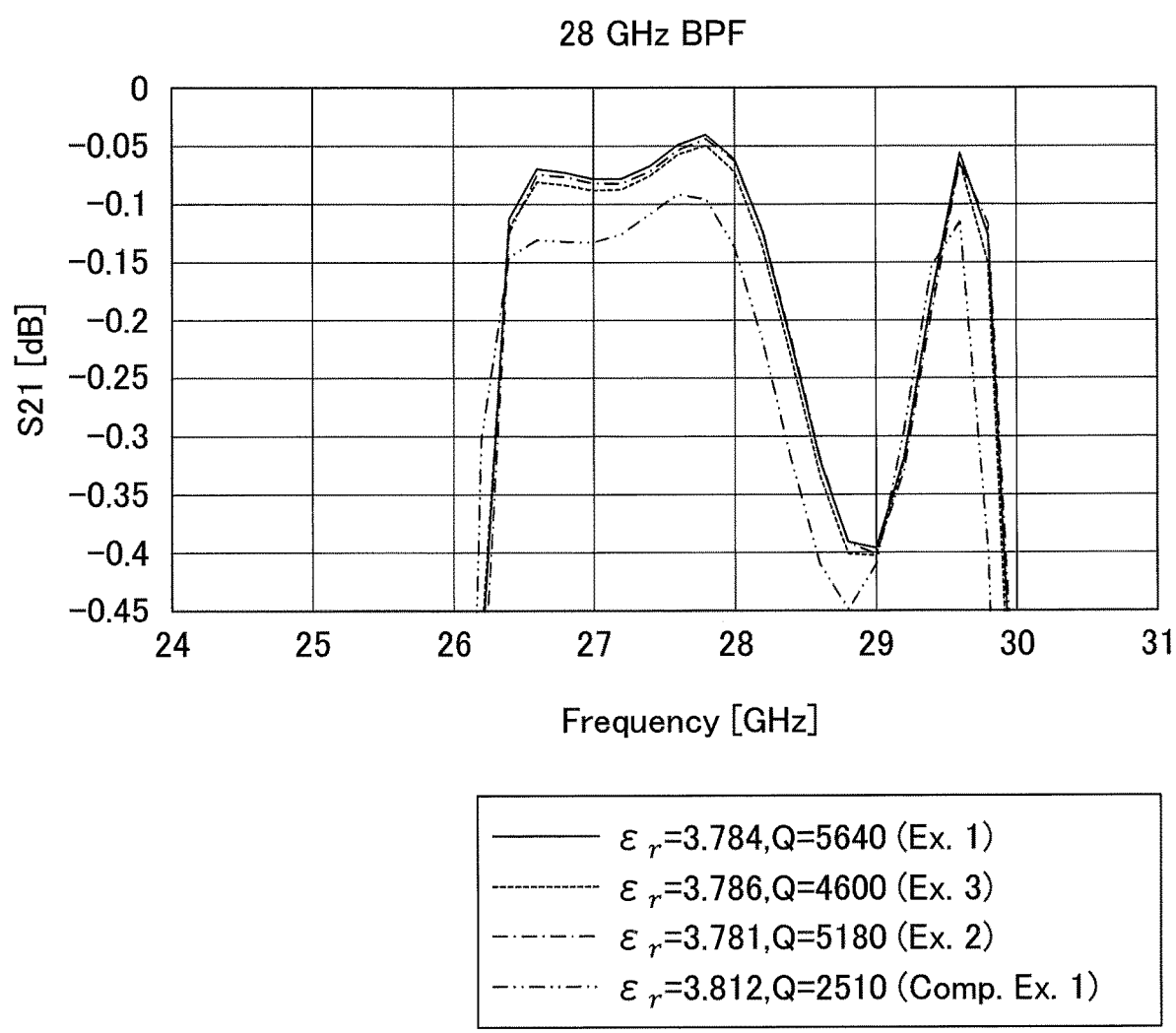
FIG. 5 is a diagram illustrating an example of a filter characteristic around 28 GHz of an SIW.

FIG. 5 illustrates an example of an analysis result of the pass characteristic S21 of the filter A that passes electromagnetic waves in the frequency band including 28 GHz. As a dielectric property of the silica glass used for the dielectric layer of the filter A, a measured value of the dielectric loss tangent tan δ measured for calculating the FQ value around 33 GHz in FIG. 3 was used. The dimensions of the dielectric layer of the filter A (see FIG. 4) are as follows by units of mm:
L1: 4.2
L2: 16.5
L3: 0.5
L4: 4.0
The length L13 of the control walls 13a and 13b: 0.9
The length L14 of the control walls 14a and 14b: 1.2
The length L15 of the control walls 15a and 15b: 1.25
The length L16 of the control walls 16a and 16b: 1.2
The length L17 of the control walls 17a and 17b: 0.9.

Figure 6:
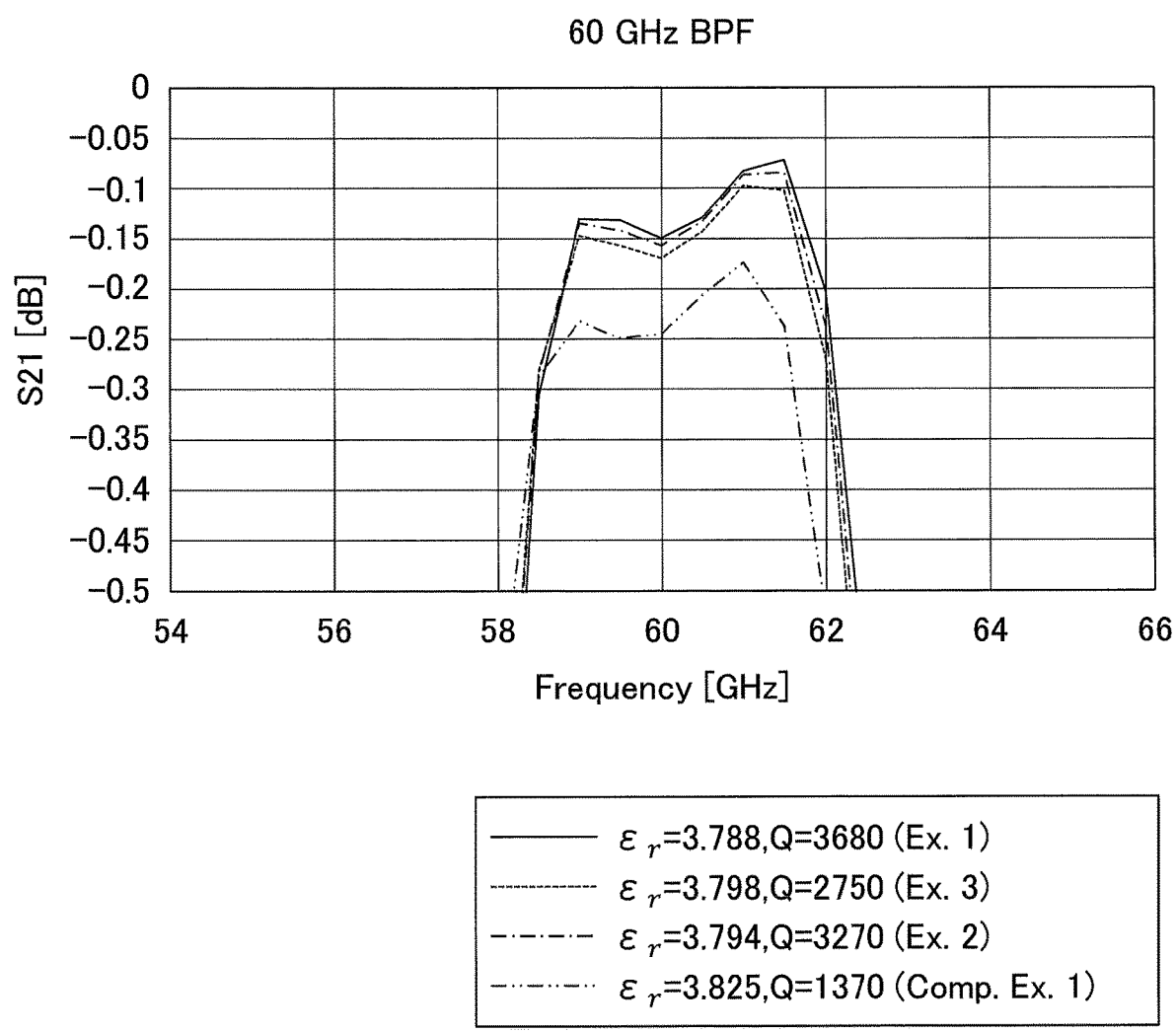
FIG. 6 is a diagram illustrating an example of a filter characteristic around 60 GHz of an SIW.

FIG. 6 illustrates an example of an analysis result of the pass characteristic S21 of the filter B that passes electromagnetic waves in the frequency band including 60 GHz. As a dielectric property of the silica glass used for the dielectric layer of the filter B, a measured value of the dielectric loss tangent tan δ measured for calculating the FQ value around 65 GHz in FIG. 3 was used. The dimensions of the dielectric layer of the filter B (see FIG. 4) are as follows by units of mm:
L1: 2.0
L2: 8.3
L3: 0.5
L4: 1.8
The length L13 of the control walls 13a and 13b: 0.25
The length L14 of the control walls 14a and 14b: 0.45
The length L15 of the control walls 15a and 15b: 0.55
The length L16 of the control walls 16a and 16b: 0.45
The length L17 of the control walls 17a and 17b: 0.25.

Figure 7:
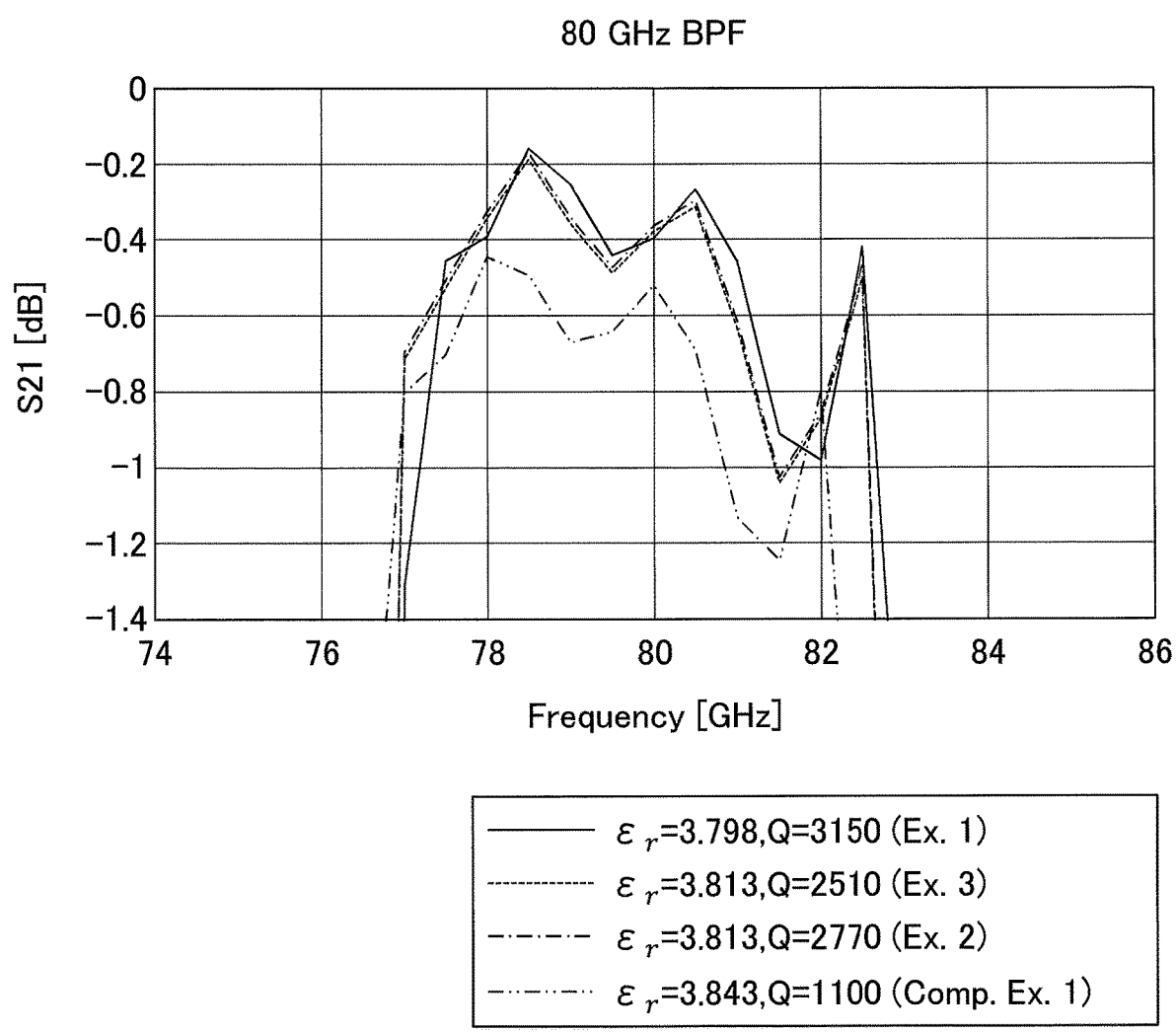
FIG. 7 is a diagram illustrating an example of a filter characteristic around 80 GHz of an SIW.

FIG. 7 illustrates an example of an analysis result of the pass characteristic S21 of the filter C that passes electromagnetic waves in the frequency band including 80 GHz. As a dielectric property of the silica glass used for the dielectric layer of the filter C, a measured value of the dielectric loss tangent tan δ measured for calculating the FQ value around 85 GHz in FIG. 3 was used. The dimensions of the dielectric layer of the filter C (see FIG. 4) are as follows by units of mm:
L1: 1.45
L2: 6.85
L3: 0.5
L4: 1.25
The length L13 of the control walls 13a and 13b: 0.32
The length L14 of the control walls 14a and 14b: 0.415
The length L15 of the control walls 15a and 15b: 0.425
The length L16 of the control walls 16a and 16b: 0.415
The length L17 of the control walls 17a and 17b: 0.32.

In FIGS. 5 to 7, a greater value of S21 (closer to zero) indicates a smaller dielectric loss of the dielectric layer, and $\varepsilon_r$ represents the relative permittivity. As illustrated in FIGS. 5 to 7, it can be understood that a lower OH group concentration results in a smaller passage loss represented by the passage characteristic S21. Also, it can be understood that a bandpass filter in a higher frequency band has a greater difference in passage loss thanks to the difference in the OH group concentration, and that a silica glass having a lower OH group concentration exhibits a better pass characteristic.

As above, according to the present inventive concept, silica glass having a higher FQ value than conventional silica glass can be provided. Also, it is possible to provide silica glass whose FQ value becomes higher as the frequency becomes higher, and exhibits a lower loss particularly in a higher-frequency band.

As above, silica glass for radio-frequency devices and radio-frequency devices have been described with reference to the embodiments; note that the present inventive concept is not limited to the above embodiments. Various modifications and improvements, such as combinations and substitutions with some or all of the other embodiments can be made within the scope of the present inventive concept.

The invention claimed is:
1. A silica glass for a radio-frequency device, the silica glass having an OH group concentration being less than or equal to 300 wtppm; and an FQ value being higher than or equal to 90,000 GHz at a frequency of higher than or equal to 25 GHz and lower than or equal to 30 GHz and higher than or equal to 200,000 GHz at a frequency of higher than or equal to 70 GHz and lower than or equal to 100 GHz.

2. A silica glass for a radio-frequency device, the silica glass having an OH group concentration being less than or equal to 100 wtppm; and an FQ value being higher than or equal to 100,000 GHz at a frequency of higher than or equal to 25 GHz and lower than or equal to 30 GHz and higher than or equal to 200,000 GHz at a frequency of higher than or equal to 70 GHz and lower than or equal to 100 GHz.

3. A silica glass for a radio-frequency device, the silica glass having an OH group concentration being less than or equal to 40 wtppm; and an FQ value being higher than or equal to 160,000 GHz at a frequency of higher than or equal to 25 GHz and lower than or equal to 30 GHz and higher than or equal to 225,000 GHz at a frequency of higher than or equal to 70 GHz and lower than or equal to 100 GHz.

4. A silica glass for a radio-frequency device, the silica glass having an OH group concentration being less than or equal to 10 wtppm; and an FQ value being higher than or equal to 160,000 GHz at a frequency of higher than or equal to 25 GHz and lower than or equal to 30 GHz and higher than or equal to 225,000 GHz at a frequency of higher than or equal to 70 GHz and lower than or equal to 100 GHz.

5. The silica glass for the radio-frequency device as claimed in claim 3, wherein the OH group concentration is less than or equal to 40 wtppm, the FQ value is higher than or equal to 125,000 GHz at a frequency of higher than or equal to 20 GHz and lower than 40 GHz, and the FQ value is higher than or equal to 175,000 GHz at a frequency of higher than or equal to 40 GHz and lower than 70 GHz.

6. The silica glass for the radio-frequency device as claimed in claim 4, wherein the OH group concentration is less than or equal to 10 wtppm, the FQ value is higher than or equal to 150,000 GHz at a frequency of higher than or equal to 20 GHz and lower than 40 GHz, and the FQ value is higher than or equal to 200,000 GHz at a frequency of higher than or equal to 40 GHz and lower than 70 GHz.

7. The silica glass for the radio-frequency device as claimed in claim 1, wherein a total concentration of metal impurities is less than or equal to 100 ppb.

8. A radio-frequency device formed using the silica glass for the radio-frequency device as claimed in claim 1.

9. A passive device formed using the silica glass for the radio-frequency device as claimed in claim 1.

10. A filter formed using the silica glass for the radio-frequency device as claimed in claim 1.

* * * * *